Figure 1:
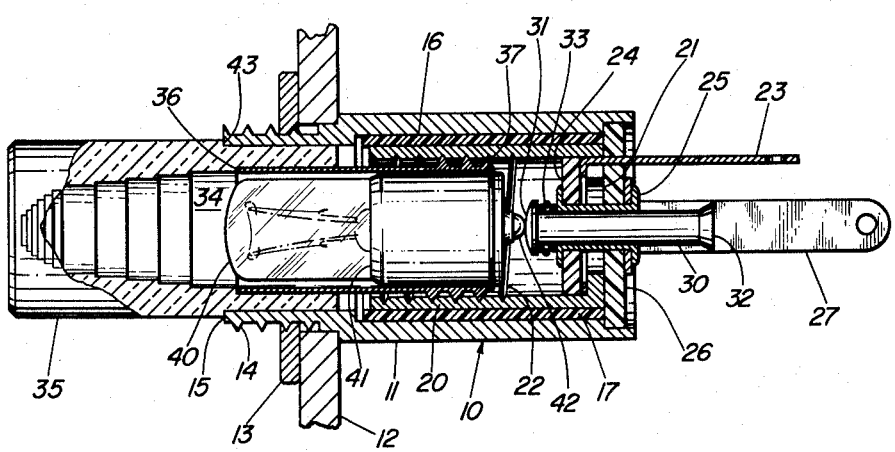

Dec. 31, 1963     C. L. FERNQUIST     3,116,480
MINIATURE REPLACEABLE LAMP INDICATOR
Filed May 15, 1961

INVENTOR.
CYRIL L. FERNQUIST
BY Everett J. Schroeder ated Dec. 31, 1963

3,116,480
MINIATURE REPLACEABLE LAMP INDICATOR
Cyril L. Fernquist, Bloomington, Minn., assignor to
Transistor Electronics Corporation, Minneapolis, Minn.,
a corporation of Minnesota
Filed May 15, 1961, Ser. No. 110,072
5 Claims. (Cl. 340—381)

This invention relates to the field of indicators using replaceable bulbs and more particularly to the field of miniature indicators using replaceable miniature lamps.

Due to the recent development of the state of the art relating to the field of digital computers, electronic counters measuring radioactive materials, airborne computing and navigational equipment, etc., the requirement for small indicating elements has increased tremendously. The indicators are usually employed to indicate the state or condition of some individual circuit of which a large number are used to complete the entire system of a computer, counting device, or the like. Since there are a rather large number of these circuits per device, there has been a consistent effort on the part of the miniature indicator manufacturer to make the indicators smaller, yet provide one which will handle an increased number of functions which must be performed.

One such method of increasing the functional capabilities of the small indicator, is to provide an indicator which does not have its housing connected to the common ground terminal of the electrical system. As those skilled in the art already know, some electronic circuits have a separate ground for the power supplies and another ground commonly known as "quiet ground" for the signal carrying circuits. In circuits employing both types of grounds it is usually common to ground the chassis or panel of the equipment to the power supplies and therefore indicators which have a grounded outer case, that is, one employing only one terminal rather than two, are limited to their application since the one terminal is usually connected to a signal bearing circuit and if the panel is connected to power ground, the purpose of using two separate grounds is defeated. For such applications using two different grounding systems, it is necessary to isolate the indicating circuit from the housing of the indicator, or for that matter in any application where it is desirable to separate each stage from the other, yet use an indicator to indicate the state or condition of a particular circuit.

Where it is necessary or desirable to isolate the indicating circuit from the housing of the indicator, it has become a problem to provide a satisfactory indicator of suitably small diametrical dimensions because of the insulation required. In view of the ever-increasing number of indicators required for panels, this need has become more and more acute with the result that any reduction in overall diameter of the indicator at the portion thereof which extends through the panel is welcomed by the user and eagerly sought after by the manufacturers. Consequently, there is an ever-increasing demand for indicators of smaller and smaller external diameters. My invention is directed toward furnishing an indicator of this type having external dimensions which require an opening in the panel of smaller diameter than any heretofore known without sacrificing efficiency or unduly increasing manufacturing costs.

It is therefore a general object of the present invention to provide a novel and improved miniature indicator of simple and inexpensive construction and small compass.

It is a more specific object of the present invention to provide an improvement in indicators of the miniature ungrounded type having two terminals.

It is another object of this invention to provide an improved ungrounded miniature indicator so designed as to be of unusually small size for use where mounting space is limited.

It is still another object of the present invention to provide an improved miniature indicator having replaceable lamps which are positioned rearwardly of the panel mounting means.

It is a further object of this invention to provide an ungrounded two-terminal indicator of the miniature variety in which lamps of different types and lengths may be used interchangeably.

It is another object of my invention to provide an improved ungrounded miniature indicator uniquely constructed and arranged so as to reduce the diameter thereof to a minimum dimension which is less than that of such indicators as heretofore known.

Figure 2:
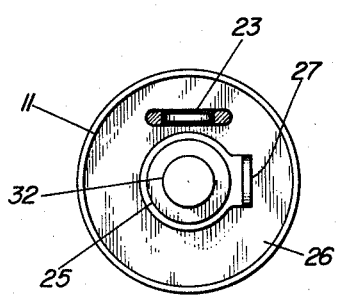

These and other features of my invention will become more apparent from the appended specification and drawings in which like reference numerals refer to like parts, and in which:

FIG. 1 is a sectional view taken along the longitudinal axis of the indicator; and FIG. 2 is an end view of the indicator showing the terminals and contact post.

One embodiment of my invention, as shown in FIGS. 1–2, is comprised of a miniature indicator 10 having a cylindrical housing 11 which is fastened to a panel 12 by a lock nut 13 that engages screw threads 14 of a neck portion 15 of the housing 11. The other end of housing 11 has a central bore 16 which is larger than the bore in the neck portion on which screw threads 14 are formed. The smaller bore in the forward neck portion forms an internal shoulder with the larger bore so that an insulating tube 17 is nestled in the larger bore 16 and is prevented from sliding forward towards neck portion 15 by the shoulder. Insulating tube 17 may be formed from paper base phenolic tubing or any other suitable insulating material. Housing 11 is constructed from aluminum alloy, or may be made from any plastic material which is readily deformable.

Located inside insulating tube 17, is an open-ended cup shaped member 20 that has a key-hole shaped hole 21 in its bottom or closed end and internal screw threads 22 located near the open end of the cup shaped walls, the threads extending downwardly towards the closed end or bottom. Cup shaped member 20 is preferably made from nickel plated brass but any electrical current carrying material will be sufficient.

Situated in the narrow part of the key-hole shaped hole 21, is an electrical terminal 23 which is T shaped with the crossbar of the T engaging the side portions of cup shaped member 20 so that electric current may be supplied from an outside source. An epoxy glass insulating washer 24 is seated in the cup shaped member 20 adjacent its bottom and bears against terminal 23 to hold it in contact with member 20. Passing through the center of washer 24 is an eyelet shaped tubular rivet 25 which has a head on each end, one head bearing against washer or disc 24.

Another insulating washer or disc 26 similar to washer 24 is crimp fitted into the end of housing 10 at the extreme end having the large bore 16. Eyelet shaped rivet 25 also passes through the center of washer 26 and its other head bears against a terminal 27. In other words, discs 24 and 26 support terminals 23 and 27 as well as holding cup shaped member 20 in fixed relation to the end of housing 11.

A post 30 is slidably located in eyelet shaped rivet 25 and contains a head 31 on the end located within cup shaped member 20 and contains another head 32 on the end that extends beyond the end of housing 11 and washer 26. A spring 33 is compressed under head 31 and bears against rivet 25 so that post 30 is constantly urged inwards towards neck portion 15. A lamp holder 34 has a light transmitting end cap 35 and a sleeve portion 36 that is press fitted into end cap 35. Situated on the end of sleeve portion 36 (opposite end cap 35) are a series of external screw threads 37 that are screwed into threads 22 formed on the inner surface of cup shaped member 20. End cap 35 is preferably made of cellulose acetate butyrate plastic but of course any suitable light transmitting material will suffice. The sleeve 36 may be made of nickel plated brass or any other good current carrying material.

A lamp 40 is held in place in the bore of sleeve 36 and has an outer electrode 41 which is generally the lamp base outer shell and a central electrode 42 that is in direct contact with post 30 at head portion 31. Electrode 41 is in electrical contact with sleeve 36 and an electrical path is formed from sleeve 36 through threads 37 and 22, through cup shaped member 20 and terminal 23. The other electrical path from lamp 40 is through electrode 42 through post 30, spring 33 and rivet 25 to terminal 27. Lamp 40 may be of any one of several types bearing the miniature flange base and may be either neon or incandescent in nature.

It should be quite clear that lamp holder 34 is screwed into threads 22 to the point where a shoulder 43 on end cap 35 engages neck portion 15 of housing 11 and prevents further compression of spring 33. For some applications it may be desirous to have a rubber, or other pliable material, seal between the shoulder 43 and neck portion 15 and this can also be provided.

From the foregoing description it will be apparent that a novel construction for a miniature indicator has been set forth which fulfills the objects of my invention. By placing the lamp base deep within the indicator and inwardly of the panel 12, it becomes possible to make the lamp housing of smaller diameter and thereby provide an improvement over the existing prior art devices. It should be understood that the foregoing description of my invention is by way of illustration only and I intend to cover all modifications and variations of said invention which fall within the spirit and scope of the appended claims.

It will, of course, be understood that various changes may be made in the form, details, arrangement and proportions of the parts without departing from the scope of this invention which consists of the matter shown and described herein and set forth in the appended claims.

What is claimed is:

1. A miniature replaceable lamp indicator comprising: a cylindrical housing having panel attaching means formed on a first end thereof for securing said housing to a panel and having a larger diameter inner bore spaced longitudinally therefrom formed in a second end of said housing; an insulating tube nestled in said larger diameter bore of said housing; a current-carrying cup shaped member having an opening in said cup bottom and screw threads on its inner cylinder-shaped surface, and adapted to fit inside said insulating tube so that said insulating tube is between said cup shaped member and said cylindrical housing; a first terminal making electrical contact with said cup shaped member; a spring loaded post located along the longitudinal axis of said cylindrical housing having its one end extending through said opening in said cup shaped member and being adapted to move along said axis when said spring is compressed; a second terminal making electrical contact with said spring loaded post; insulating disc means secured transversely of said cup shaped member and said cylindrical housing at said second end for supporting said spring loaded post and said first and second terminals; a cylinder-shaped lamp holder having a light tarnsmitting end cap on a first end and a current-carrying sleeve with external screw threads on the other end, said end cap and said sleeve portions being of such diameter that said lamp holder slides through said first end of said cylindrical housing to engage said screw threads of said cup shaped member; and a miniature lamp adapted to fit into said sleeve of said lamp holder so that one terminal of said lamp engages said sleeve and the other terminal engages said spring loaded post.

2. The invention as set forth in claim 1 wherein the bore of said cylindrical housing at said first end is substantially the same diameter as the inner bore of said cup shaped member.

3. The invention as set forth in claim 1 wherein said cup shaped member and said insulating tube extend between said second end of said housing and said panel attaching means so that said screw threads of said cup shaped member are longitudinally located away from said housing first end.

4. The invention as set forth in claim 1 wherein said housing first end is of smaller outside diameter than said second end so that a shoulder is formed thereon, and said panel attaching means comprise screw thread and nut means cooperating with said housing first end.

5. The invention as set forth in claim 1 wherein said lamp holder end cap is fixedly fitted onto said sleeve and said end cap has a shoulder formed thereon cooperating with said first end of said cylindrical housing to limit the longitudinal travel of said lamp holder.

References Cited in the file of this patent

UNITED STATES PATENTS

| | | |
|---|---|---|
| 2,756,412 | Harrington | July 24, 1956 |
| 2,825,896 | Schellman et al. | Mar. 4, 1958 |